(12) United States Patent
Vargus et al.

(10) Patent No.: US 11,148,485 B2
(45) Date of Patent: Oct. 19, 2021

(54) CONFIGURABLE VALVE STEM ASSEMBLY

(71) Applicant: ORANGE SEAL, Leander, TX (US)

(72) Inventors: John Vargus, Austin, TX (US); Stephen Sweet, Leander, TX (US)

(73) Assignee: ORANGE SEAL, Leander, TX (US)

( * ) Notice: Subject to any disclaimer, the term of this patent is extended or adjusted under 35 U.S.C. 154(b) by 0 days.

(21) Appl. No.: 15/982,499

(22) Filed: May 17, 2018

(65) Prior Publication Data

US 2018/0333997 A1    Nov. 22, 2018

Related U.S. Application Data

(60) Provisional application No. 62/507,341, filed on May 17, 2017.

(51) Int. Cl.
*F16K 15/20*    (2006.01)
*B60C 29/02*    (2006.01)
*B60C 29/00*    (2006.01)

(52) U.S. Cl.
CPC ............ *B60C 29/02* (2013.01); *B60C 29/002* (2013.01); *B60C 29/005* (2013.01); *Y10T 137/3584* (2015.04)

(58) Field of Classification Search
CPC ................................................ Y10T 137/3584
USPC ........................................................ 152/427
See application file for complete search history.

(56) References Cited

U.S. PATENT DOCUMENTS

| | | |
|---|---|---|
| 2,685,907 A | 8/1954 | Waddell |
| 3,032,091 A | 5/1962 | McCord |
| 3,087,529 A | 4/1963 | Morton |
| 3,213,915 A | 10/1965 | Smith |
| 3,510,929 A | 5/1970 | Kilmarx |
| 4,016,918 A | 4/1977 | Thacker |
| 4,064,923 A | 12/1977 | German et al. |
| 4,538,658 A | 9/1985 | Earley |
| 5,211,782 A | 5/1993 | Thelen |
| 6,003,546 A * | 12/1999 | Thanscheidt ......... B60C 29/064 137/223 |
| 6,101,870 A | 8/2000 | Kato et al. |
| 6,904,795 B1 | 6/2005 | Uleski |
| 7,086,411 B2 | 8/2006 | Uleski |

(Continued)

FOREIGN PATENT DOCUMENTS

| | | |
|---|---|---|
| GB | 271947 A | 6/1927 |
| GB | 725775 A | 3/1955 |

(Continued)

OTHER PUBLICATIONS

"Grommet" Printed Apr. 9, 2020.*

(Continued)

*Primary Examiner* — Robert K Arundale
(74) *Attorney, Agent, or Firm* — Millen, White, Zelano & Branigan, PC; Ryan Pool

(57) ABSTRACT

A valve stem assembly for a tire includes a removable grommet of a plurality of grommets having different shapes and sizes. The removable grommets allow the valve stem assembly to be used on a variety of rims. Each grommet fits into distinct holes within the rims. The valve stem assembly also includes a valve stem body that receives the removable grommets and an attachment end that encloses a valve core within the valve stem body. A cap may cover the valve core and attachment end.

8 Claims, 5 Drawing Sheets

(56) References Cited

U.S. PATENT DOCUMENTS

| | | | |
|---|---|---|---|
| 7,086,412 B2 | 8/2006 | Uleski | |
| 7,259,337 B1* | 8/2007 | Gretz | H02G 3/06 |
| | | | 174/481 |
| 8,661,886 B2 | 3/2014 | Choe | |
| 2006/0118173 A1* | 6/2006 | Yamamoto | B60C 29/062 |
| | | | 137/223 |
| 2011/0315235 A1* | 12/2011 | Colefax | B60C 23/0408 |
| | | | 137/224 |
| 2013/0233069 A1 | 9/2013 | Amamiya | |

FOREIGN PATENT DOCUMENTS

| | | | |
|---|---|---|---|
| GB | 739529 A | 11/1955 | |
| GB | 827524 A | 2/1960 | |

OTHER PUBLICATIONS

"contoured" Merriam-Webster, printed Jan. 21, 2021.*
"contoured" Macmillan, printed Jan. 21, 2021.*
International search report in corresponding PCT/US2018/033199 dated Jul. 30, 2018.
Supplementary EP search report in corresponding EP18801617.4 dated Nov. 20, 2020 (pp. 1-2) and form1507 (pp. 1-8).
Office Action in corresponding CN201880032994.1 dated Jul. 5, 2021 (pp. 1-7).

\* cited by examiner

CONFIGURABLE VALVE STEM ASSEMBLY

FIELD OF THE INVENTION

The present invention relates to valve stem assemblies for use with tires, such as a tubeless valve stem for a tire on a bicycle.

DESCRIPTION OF THE RELATED ART

In the tire industry, tire valves are adapted to be mounted on the rim for a tire. The tire valve assembly may include a rubber grommet fitted over an elongated metallic valve stem. The rubber grommet is either bonded to the valve stem or provides for an interference fit to thereby provide for a permanent connection between valve assembly components. The grommet has an external shape that adapts it to fit into a hole in the tire rim.

Problems, however, may arise when the valve stems are to be used with a variety of tire rims. Different rims may have different shaped or sized holes. As the grommet is permanently attached, one would need to have several different valve stems available. This increases costs as well as time spent replacing or changing valve stems.

SUMMARY OF THE INVENTION

A valve stem assembly incorporating a plurality of grommets to be fitted on a valve stem body having a base is disclosed. The plurality of grommets includes at least two different shapes or sizes for the grommets. The shapes may include a conical shape or a substantially square shape. The plurality of grommets is removable from the valve stem body.

A valve stem assembly including a removable grommet engaged with a valve stem body also is disclosed. The removable grommet may be substantially conical shaped or substantially square shaped.

Another valve stem assembly also is disclosed. The valve stem assembly includes a valve stem body having a base. The valve stem assembly also includes a removable grommet to fit onto the valve stem body and to press against the base. The valve stem assembly also includes an attachment end positioned opposite the base and the removable grommet on the valve stem body. The valve stem assembly also includes a valve core to fit within the valve stem body and to be accessible through the attachment end. The valve stem assembly also includes a cap to fit over the valve core and the attachment end.

Another valve stem assembly is disclosed. The valve stem assembly includes a valve stem body. The valve stem assembly also includes a first removable grommet to fit onto the valve stem body. The valve stem assembly also includes an attachment end positioned opposite the removable grommet on the valve stem body.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

A key feature of the disclosed embodiments is a removable grommet that fits onto the valve stem body. The removable grommet may be one of several grommets that can fit onto the valve stem body. This adaptability allows different versions of valve stems be configured without the need for an entirely different valve stem. In other words, the same components may be used with the different grommets to fit into different tire rims. The different shapes and sizes of the grommets fit into different holes. One can determine with grommet to use by looking at the shape and size of the hole and construct the valve stem assembly accordingly.

The different grommets may be comprised of rubber. The grommets are not bonded or vulcanized to the valve stem body. Thus, the problems with conventional fixed grommets may be avoided. Vulcanized grommets are used to prevent leaks in a tire, but the fitted removable grommet will engage the hole to also prevent leaks. Further, costs to produce valve stems are reduced as only the grommet needs to be changed for different configurations. One can use a single valve stem assembly with a plurality of grommets to fit any number of tire rims. With traditional valve stems, when the vulcanized grommet wears out, one must purchase a whole new valve stem. The disclosed embodiments allow one to replace the grommet, thereby saving money and materials.

The shapes of the removable grommets may vary. Shapes include conical shapes, square shapes, substantially U-shaped, and the like. If a wheel requires a very specific shape, then that type of grommet can be made and used in the disclosed valve stem assembly. When a wheel comes into a shop, the specific valve stem assembly is identified and configured onsite. There is no need to order additional valve stems for the wheel.

In some embodiments, a valve core may be fitted into the valve stem body and covered with an attachment end or cap. In other embodiments, the valve stem assembly is a tubeless valve stem that fits into the tire or wheel.

Figure 1:
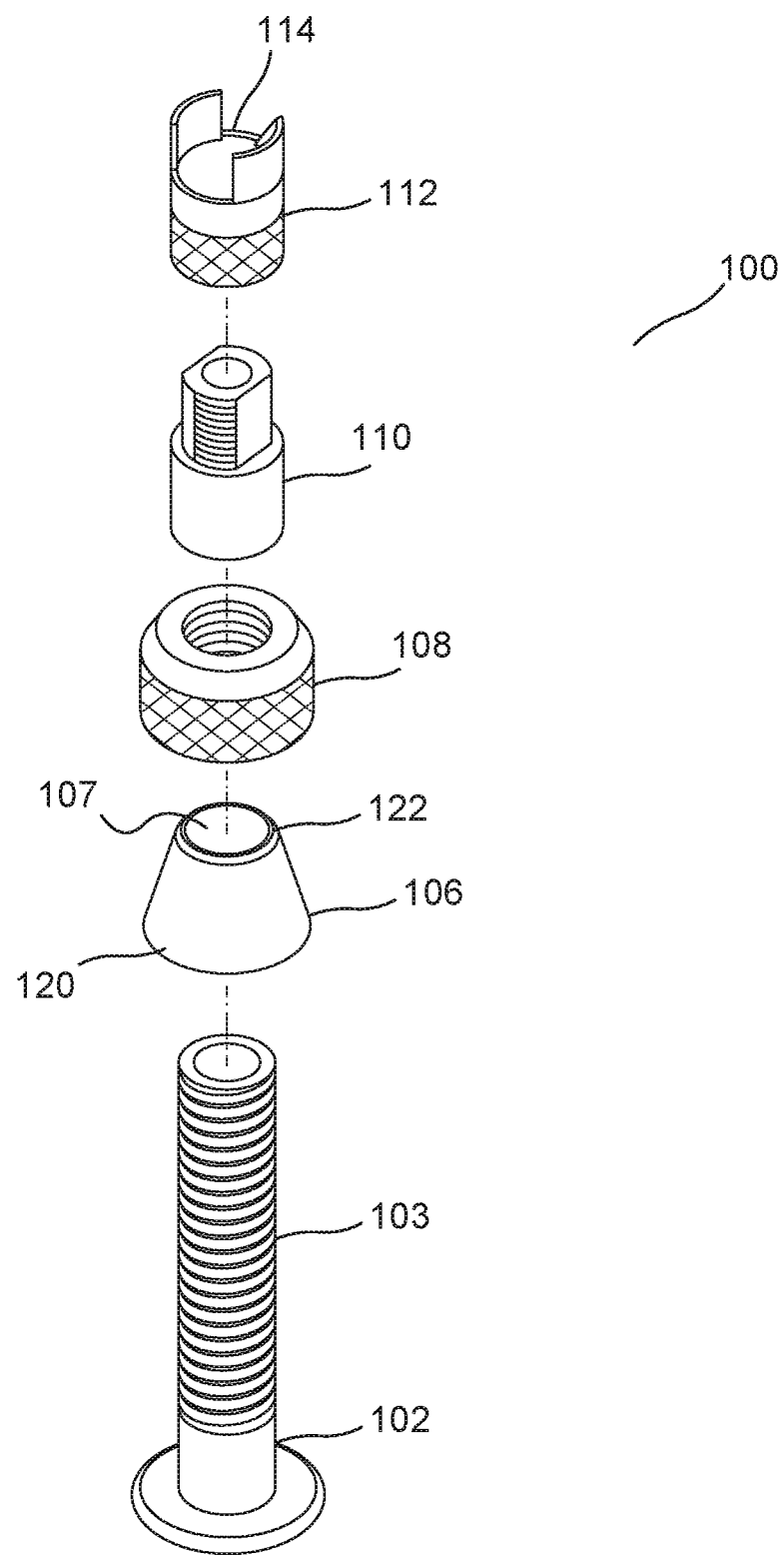
FIG. 1 illustrates a valve stem assembly according to the disclosed embodiments.

FIG. 1 depicts a valve stem assembly 100 according to the disclosed embodiments. Valve stem assembly 100 includes valve stem body 102. Valve stem body 102 is cylindrical shaped and extends from a base 104. Valve stem body 102 also includes an externally threaded portion 103. Valve stem body 102 may be composed a metallic substance, such as brass, steel, and the like. Valve stem body 102 also may be composed of a non-metallic substance, such as plastic.

Valve stem assembly 100 also includes removable grommet 106. As shown, removable grommet 106 fits onto valve stem body 102. Removable grommet 106 preferably is made of rubber. The composition of the rubber provides a resistance to sealant products. Further, the rubber should be flexible enough to contour into the profile of the rim used in conjunction with valve stem assembly 100. It also should not have a high hardness or durometer measurement but not too soft as it must fill and seal the connection.

Grommet 106 may press onto base 104 with end portion 120. Fitted portion 122 is on the opposite end of grommet 106. Fitted portion 122 is shaped to engage a hole in the tire or wheel and seal the chamber within from losing air. Removable grommet 106 also includes central opening 107 in communication with valve stem body 102 so as to allow the flow of air through valve stem assembly 100 upon actuation of a valve core.

Nut 108 fits onto threaded portion 103 of valve stem body 102. Nut 108 may be located above removable grommet 106. Nut 108 may be moved into a desired position on valve stem body 102.

Attachment end 110 is positioned on the end of valve stem body 102 opposite from base 104 and removable grommet 106. Attachment end 110 engages with cap 112 to close the air flow through valve stem assembly 100. In some embodiments, a valve core may be covered by attachment end 110 and cap 112. Cap 112 includes a notch 114 that, when engaged, rotates cap 112 to detach from attachment end 110. Attachment end 110 may fit into a central opening of nut 108 or onto threaded portion 103.

According to some embodiments, it is important that grommet 106 and valve stem body 102 mate together to form a tight seal. The inner diameter of grommet 106 must correspond with the outer diameter of the valve stem body 102. Grommet 106, however, should be flexible enough to fit on the valve stem body tightly and without a lot of pressure needed to fit the grommet.

Figure 2:
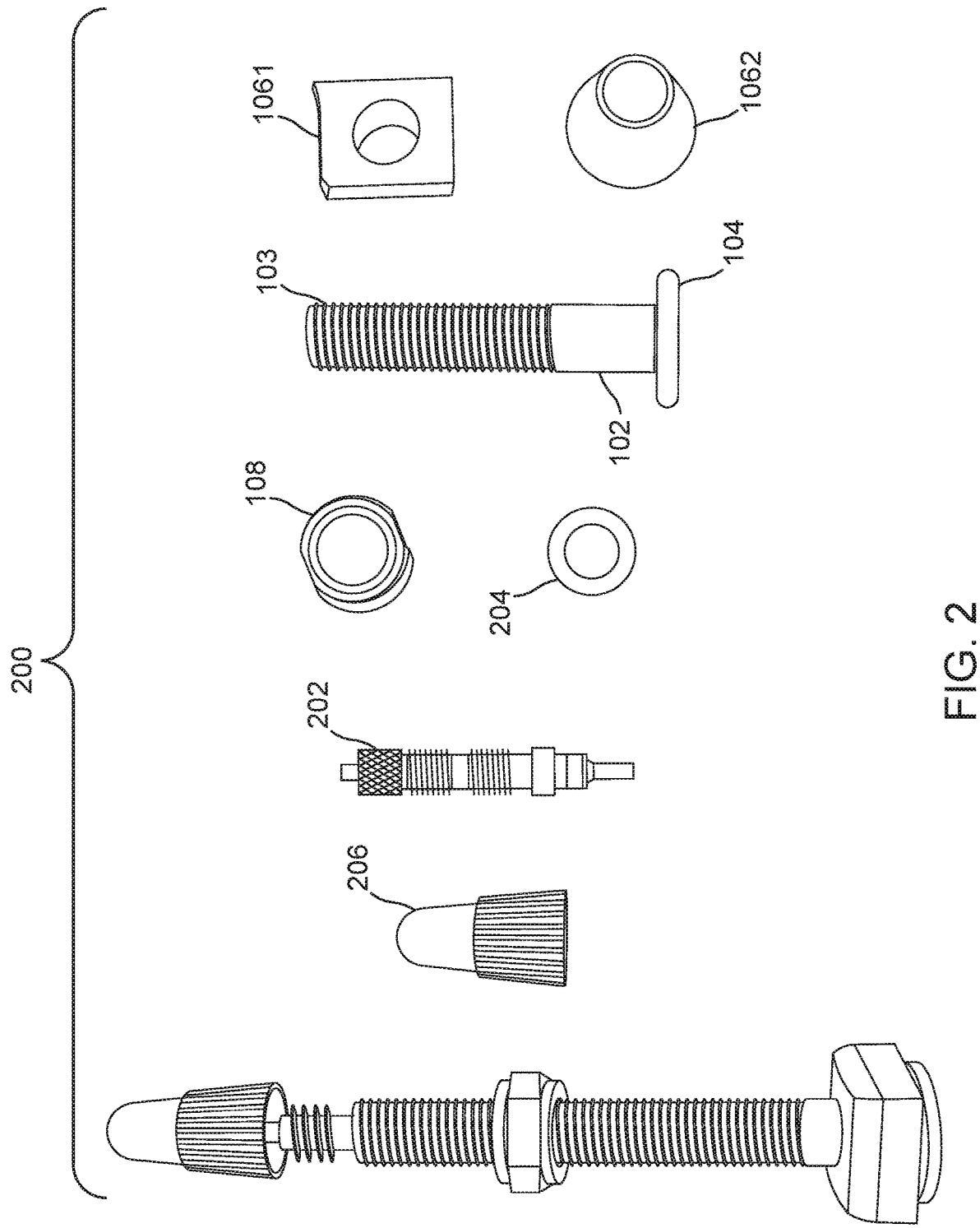
FIG. 2 illustrates another valve stem assembly according to the disclosed embodiments.

Another embodiment of the disclosed valve assembly may be seen in FIG. 2. FIG. 2 depicts another valve stem assembly 200 according to the disclosed embodiments. Valve stem assembly 200 may provide the same functionality as valve stem assembly 100. FIG. 2 shows an assembled valve stem assembly 200 and a dissembled valve stem assembly 200.

Some of the components of valve stem assembly 200 are similar to those of valve stem assembly 100, and these components are labeled as such. For removable grommet 106, two different types of grommets are shown. Substantially square shaped grommet 1061 and conical shaped grommet 1062 may be placed over valve stem body 102 to fit holes that are required a square or conical grommet. Grommets 1061 and 1062 are not permanently attached or vulcanized to base 104 or valve stem body 102. These shapes are disclosed in greater detail below.

Valve stem assembly 200 also includes valve core 202. Valve core 202 may be actuated in a manner to allow air to flow in and out through valve stem assembly 200. A valve plunger may be actuated to open a passage through valve core 202. The valve plunger may be used as an anti-clogging tool when sealant accumulates inside valve stem body 102. A hose to provide air may be attached to an end of valve core 202 that engages the plunger to provide the air. Valve core 202 may be fitted into valve stem body 102.

Valve stem assembly 200 also may include washer 204 to be placed below nut 108 on valve stem body 102. Nut 108 and washer 204 may stabilize valve stem assembly 200 when mounted to the wheel. Cap 206 may fit over valve core 202 and is removable by unscrewing it off the valve core. Cap 206 is shaped differently than cap 112 as it is removed using one's fingers. In some embodiments, cap 206 may act as the attachment end and the cap.

Figure 3A:
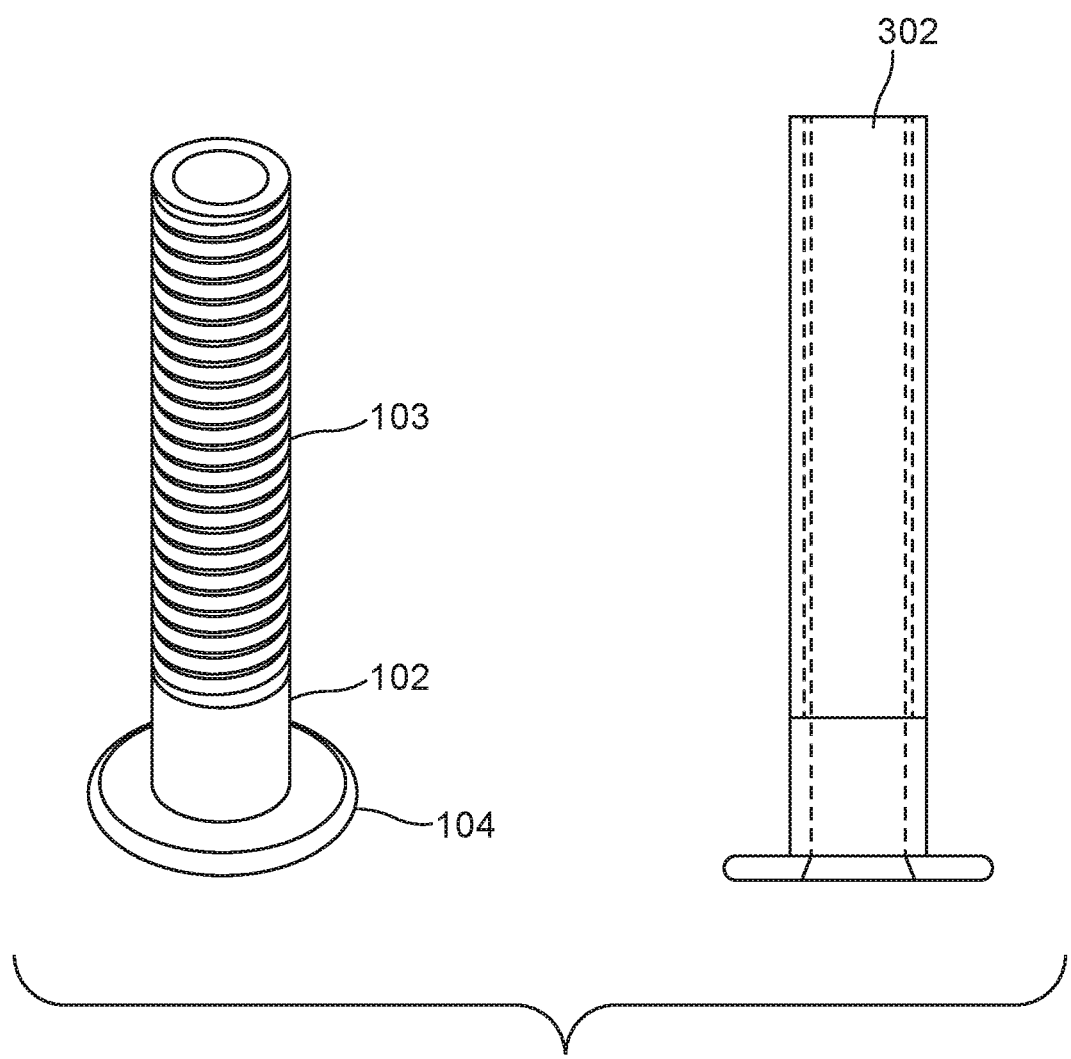
FIG. 3A illustrates a version of a valve stem body according to the disclosed embodiments.
Figure 3B:
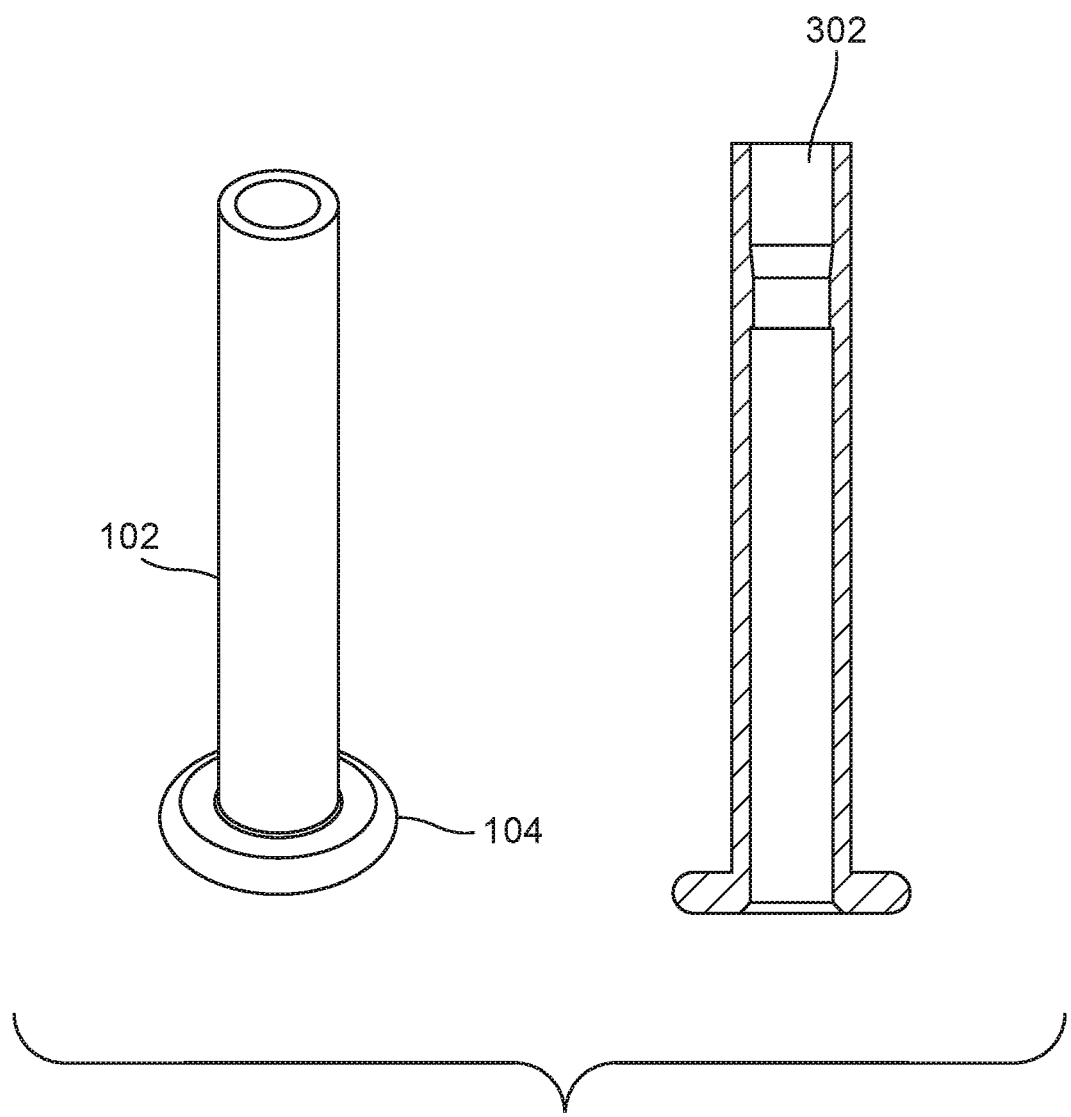
FIG. 3B illustrates another version of a valve stem body according to the disclosed embodiments.

FIGS. 3A and 3B depict different versions of valve stem body 102 according to the disclosed embodiments. FIG. 3A shows a valve stem body 102 having threaded portion 103 along with base 104. The preferred dimensions for valve stem body 102 also are shown. The preferred dimensions are provided for illustrative purposes only. Valve stem body 102 may include other dimensions as needed for a valve stem assembly.

Valve stem body 102 also includes passage 302. Passage 302 allows air to flow in and out of the tire. It also may fit a valve core, such as valve core 202, to configure the valve stem assembly.

FIG. 3B shows a valve stem body 102 that does not include a threaded portion. Instead, the body has a smooth external surface. A removable grommet still fits over valve stem body 102 and rests on base 104. A cross-sectional view of the valve stem body is provided as well, which shows passage 302.

Figure 4A:
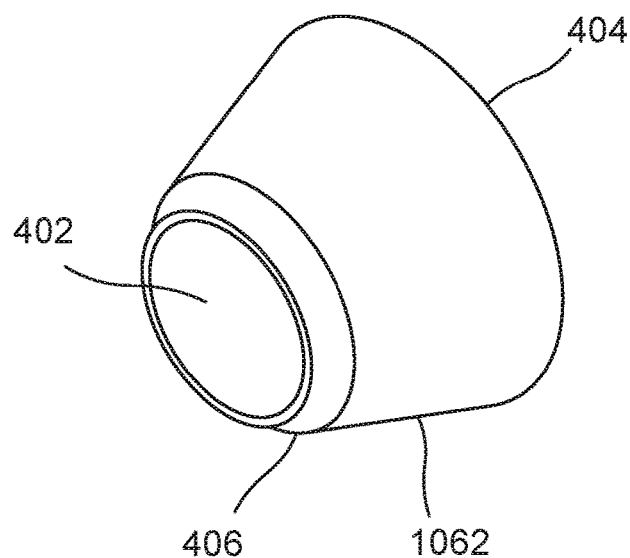
FIG. 4A illustrates a conical removable grommet according to the disclosed embodiments.

FIG. 4A depicts a conical removable grommet 1062 according to the disclosed embodiments. Removable grommet 1062 has a substantially conical shape. Thus, it would fit into a hole having a round or conical shape. Grommet 1062 includes center passage 402 that fits over valve stem body 102. Grommet 1062 also includes a bottom side 404 and a top side 406. Bottom side 404 presses against base 104. Top side 406 presses into the hole and includes a tapered portion. Preferred dimensions for removable grommet 1062 are shown in FIG. 4A. These dimensions are provided for illustrative purposes only.

Figure 4B:
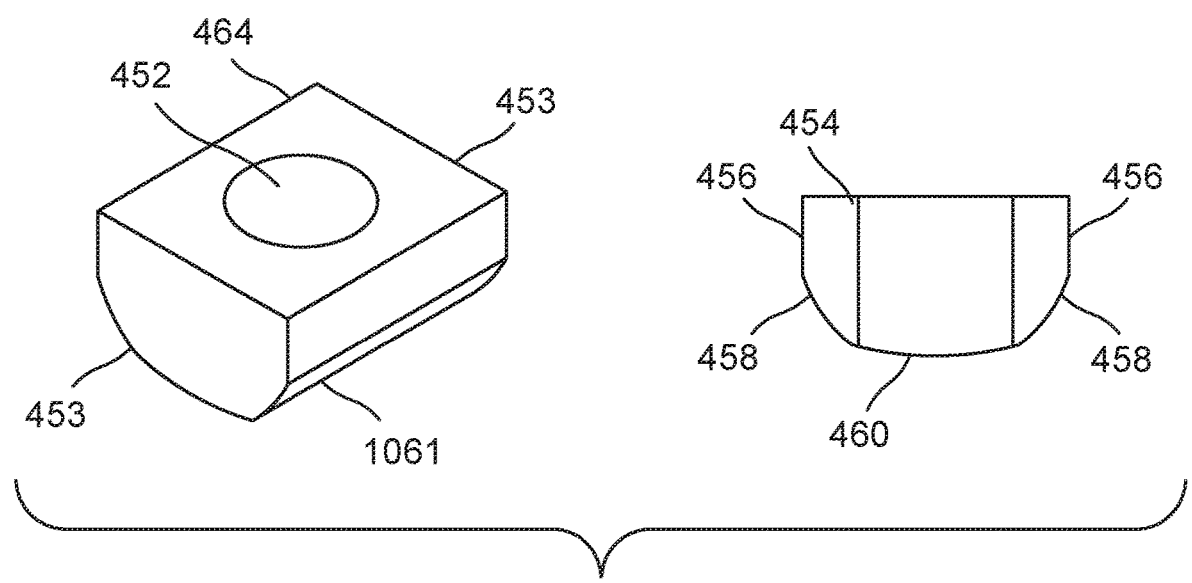
FIG. 4B illustrates a substantially square shaped removable grommet according to the disclosed embodiments.

FIG. 4B depicts a substantially square shaped removable grommet 1061 according to the disclosed embodiments. Grommet 1061 acts like grommet 1062 but is shaped differently to fit into a square, or substantially square, hole. It includes center passage 452 to fit onto valve stem body 102. Removable grommet 1061 also includes flat sides 453 and curved sides 456 along a top side 462 and bottom side 464. Flat sides 453 may be opposite each other. Curved sides 456 also may be opposite each other. Curved sides 456 include tapered portions 458 that curve inwardly to top portion 460. Top portion 460 also may be curved. This allows grommet 1062 to fit into square holes and seal them without leaking air.

Thus, the disclosed embodiments include valve stem assemblies that having removable grommets to fit a variety of holes in tires and wheels. One may assemble the valve stems using the desired shape to fit the hole and placing the proper grommet onto the valve stem body. The rest of the valve stem is assembled using common parts.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional Application Ser. No. 62/507,341, filed May 17, 2017, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A valve stem assembly for a bicycle rim assembly, the valve stem assembly consisting of:
    a valve stem body having a base, the valve stem body to extend through the bicycle rim assembly, wherein the valve stem body is comprised of a single piece that extends through a hole in the bicycle rim assembly to outside an exterior side of the bicycle rim assembly;
    a removable grommet to fit onto the valve stem body, the removable grommet has an at least partially frustum shape at least in state before being attached to a bicycle rim assembly and comprises a bottom flat side and a fitted portion such that the bottom flat side is arranged to press against the base of the valve stem body and the fitted portion to align with the hole located on an interior side of the bicycle rim assembly;
    a nut and a washer to fit onto the valve stem body and fitted to the exterior side of the bicycle rim assembly, wherein the removable fitted grommet is placed between the base of the valve stem body and the nut and the washer;
    an attachment end positioned opposite the base of the valve stem body and the removable fitted grommet on the valve stem body;
    a valve core to fit within the valve stem body and to be accessible through the attachment end; and
    a cap to fit over the valve core and the attachment end.

2. The valve stem assembly of claim 1, wherein the removable fitted grommet is comprised of rubber.

3. A valve stem assembly kit for fitting to a bicycle rim assembly, the kit consisting of:
    a valve stem body having an externally threaded portion, the valve stem body to extend through a hole in the bicycle rim assembly, wherein the valve stem body is comprised of a single piece;
    a valve core to fit inside the valve stem body;
    a nut and a washer to fit onto the externally threaded portion and placed on an exterior side of the bicycle rim assembly;
    a first removable grommet to fit onto the valve stem body below the nut, wherein the first removable grommet is fitted to an interior side of the hole;
    a second removable grommet to fit onto the valve stem body below the nut, wherein the second removable grommet is not fitted to the interior side of the hole; and
    an attachment end positioned opposite the first removable grommet on the valve stem body.

4. The valve stem assembly kit of claim 3, wherein the first or the second removable grommet is comprised of rubber.

5. A valve stem assembly kit for attaching to a bicycle rim assembly having a bicycle rim with a hole having an interior profile, the kit consisting of:
    a valve stem body having a base, wherein the valve stem body extends through the hole in the bicycle rim assembly and wherein the valve stem body is comprised of a single piece;
    a valve core to fit within the valve stem body;
    a removable grommet to fit onto the valve stem body, the removable grommet having a bottom flat side and a fitted portion such that the bottom flat side is arranged to press against the base of the valve stem body and the fitted portion is to align with the interior profile of the bicycle rim; and
    a nut and a washer to secure the valve stem body to the bicycle rim on an exterior profile opposite the interior profile,
    wherein, when assembled, the valve stem assembly kit fits onto the bicycle rim.

6. The valve stem assembly kit of claim 5, wherein the valve stem body consists of an externally threaded portion.

7. The valve stem assembly kit of claim 5, wherein the top shaped side of the removable fitted grommet includes a conical shape.

8. The valve stem assembly kit of claim 5, wherein the top shaped side of the removable fitted grommet includes a substantially square shape.

* * * * *